United States Patent
Cook et al.

(10) Patent No.: US 7,133,514 B1
(45) Date of Patent: Nov. 7, 2006

(54) PREMISE-BASED VOICE BRIDGE EXTENSION

(75) Inventors: Fred S. Cook, Olathe, KS (US); Peter H. H. Distler, Overland Park, KS (US); Nathan D. Stout, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 102 days.

(21) Appl. No.: 10/874,831

(22) Filed: Jun. 23, 2004

(51) Int. Cl.
*H04M 3/42* (2006.01)

(52) U.S. Cl. ................. 379/202.07; 379/198; 379/232

(58) Field of Classification Search ..................... None
See application file for complete search history.

(56) References Cited

U.S. PATENT DOCUMENTS

| | | | |
|---|---|---|---|
| 5,812,552 A * | 9/1998 | Arora et al. | 370/395.53 |
| 6,542,475 B1 | 4/2003 | Bala et al. | |
| 6,577,622 B1 | 6/2003 | Schuster et al. | |
| 6,600,734 B1 | 7/2003 | Gernert et al. | |
| 6,628,767 B1 * | 9/2003 | Wellner et al. | 379/202.01 |
| 6,782,413 B1 * | 8/2004 | Loveland | 709/204 |
| 6,823,050 B1 * | 11/2004 | Brown et al. | 379/93.21 |
| 6,993,120 B1 * | 1/2006 | Brown et al. | 379/88.13 |
| 7,003,286 B1 * | 2/2006 | Brown et al. | 455/416 |
| 2002/0085516 A1 | 7/2002 | Bridgelall | |
| 2003/0002448 A1 | 1/2003 | Laursen et al. | |
| 2003/0028599 A1 | 2/2003 | Kolsky | |
| 2003/0035381 A1 * | 2/2003 | Chen et al. | 370/261 |
| 2003/0058806 A1 | 3/2003 | Meyerson et al. | |
| 2003/0152055 A1 | 8/2003 | Aragones et al. | |
| 2004/0081296 A1 * | 4/2004 | Brown et al. | 379/88.14 |
| 2004/0161082 A1 * | 8/2004 | Brown et al. | 379/93.21 |
| 2004/0196867 A1 * | 10/2004 | Ejzak et al. | 370/468 |
| 2004/0203621 A1 * | 10/2004 | Brown et al. | 455/412.1 |

OTHER PUBLICATIONS

Spectralink, The Link Wireless Telephone System™, Issue 1.2, Dec. 1999, pp. 1-17.
Spectralink, Link Wirless Telephone System, 2003.

* cited by examiner

*Primary Examiner*—Creighton Smith

(57) ABSTRACT

A telephony system for completing conference calls includes a premise-based network having a local controller coupled to local endpoints, a proxy, and a conference bridge. The telephony system includes a public telephone network coupled to the premise-based network. A request call is initiated to the proxy for setting up the conference call. The request call is routed to the conference bridge. A plurality of local endpoints for participation in the conference call is provided to the proxy via the request call. The local controller contacts the plurality of local endpoints and routes successful connections to the conference bridge. The request call and the successful connections are then bridged at the conference bridge.

15 Claims, 5 Drawing Sheets

PREMISE-BASED VOICE BRIDGE EXTENSION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to telephonic conference calling, and, more specifically, to a local conference bridge in a premise-based network for extending the number of participants in a conference call.

Telephone conference calls are a widely available service for connecting three or more different telephone terminals for the mutual exchange of voice and/or video communication signals. In a typical arrangement using the public telephone system, each of the separate conference call participants are connected to a conference bridge. The cost and complexity of maintaining a conference bridge is proportional to the particular number of ports provided in the bridge allowing participants to connect to a particular conference call. Thus, there are practical limits to the number participants to any particular conference call under control of a single conference bridge.

In addition to requiring separate ports for each participant, prior art conference calling utilizes individual dedicated circuits between the terminal of each conference call participant and the conference bridge. When multiple participants of a conference call are located in close proximity (e.g., separate telephone terminals within a building served by a private branch exchange or terminals served by the same telephone company central office), then the multiple individual circuits to the conference bridge may result in an inefficient use of the telephone switching circuits and communication channels.

Privately owned enterprise systems such as a private branch exchange (PBX) or a wireless local area network (WLAN) are becoming widely used because of their reduced cost and increased availability of various calling features. These systems are especially useful in the context of enterprise communication systems (e.g., telephony systems for business or governmental organizations) involving large numbers of coworkers, associates, and colleagues wherein many conference calls may be conducted involving participants and different endpoints or terminals within the enterprise system. This increases the likelihood of inefficient utilization of conference bridge and telephone circuit resources when establishing conference calls.

SUMMARY OF THE INVENTION

The present invention advantageously creates endpoint connections for a conference call using a proxy and a conference bridge within a premise-based network, thereby reducing the number of ports required from a public conference bridge in a public telephone network and reducing circuit usage in the public telephone network.

In one aspect of the invention, a method is provided for completing a conference call in a telephony system, wherein the telephony system includes a premise-based network having a local controller coupled to local endpoints, a proxy, and a conference bridge, and wherein the telephony system includes a public telephone network coupled to the premise-based network. A request call is initiated to the proxy for setting up the conference call. The request call is routed to the conference bridge. A plurality of local endpoints for participation in the conference call is provided to the proxy via the request call. The local controller contacts the plurality of local endpoints and routes successful connections to the conference bridge. The request call and the successful connections are then bridged at the conference bridge.

DETAILED DESCRIPTION OF PREFERRED EMBODIMENTS

The present invention involves premise-based telephony networks wherein the public switched telephone network (PSTN) is connected to a private network such as a private branch exchange (PBX) or a wireless local area network (WLAN) telephony system for providing telephony service to a plurality of terminals in a particular premises (e.g., building or group of buildings) or an enterprise. Particular telephone lines having corresponding telephone numbers associated with them may be connected between the PSTN and the premise-based network. The telephone numbers may correspond to specific terminals or extensions within the premise-based network, but actual addressing of terminals within the premise-based network is determined by locally-managed data network addresses as is known in the art.

Figure 1:
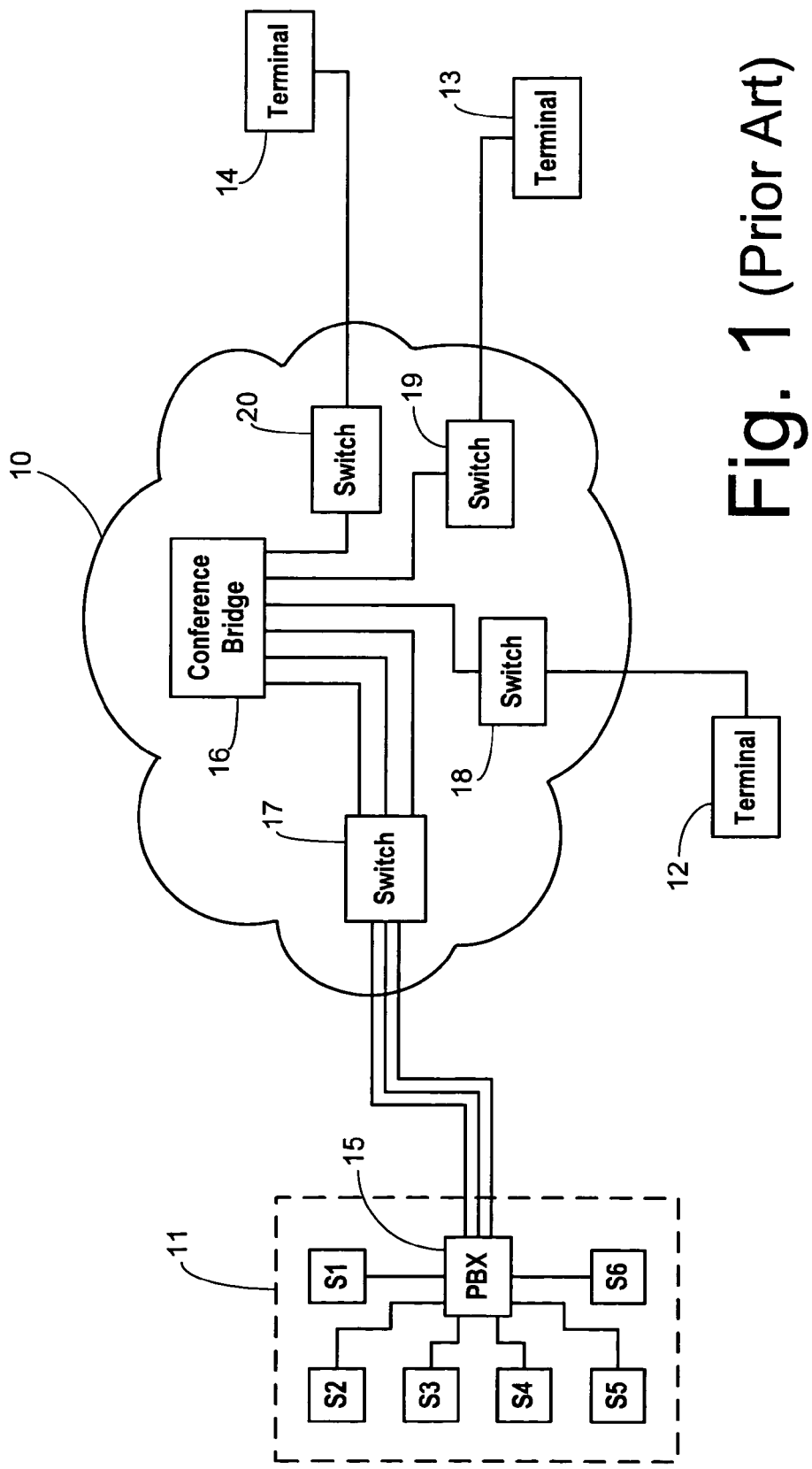
FIG. 1 is a block diagram showing a prior art conference call wherein participants are interconnected through a public conference bridge.

FIG. 1 shows a prior art conference calling system wherein a public switched telephone network (PSTN) 10 interconnects a premise-based PBX network 11 with wire line terminals 12, 13 and 14. Premise-based network 11 includes a PBX controller 15 and a plurality of stations S1 through S6. PSTN 10 includes a public conference bridge 16 and a plurality of telephony switches 17, 18, 19 and 20 (such as a class 5 central office switch). A user at any terminal or station may participate in a conference call by connecting to conference bridge 16 and providing necessary information for connecting to the particular conference call. In the event that a plurality of participants to the conference call happen to be utilizing separate stations within a premise-based network 11, then redundant communication channels and switching circuitry is required between premise-based network 11 and conference bridge 16. Furthermore, a separate port is required from conference bridge 16 to handle each individual participant connecting from premise-based network 11.

Figure 2:
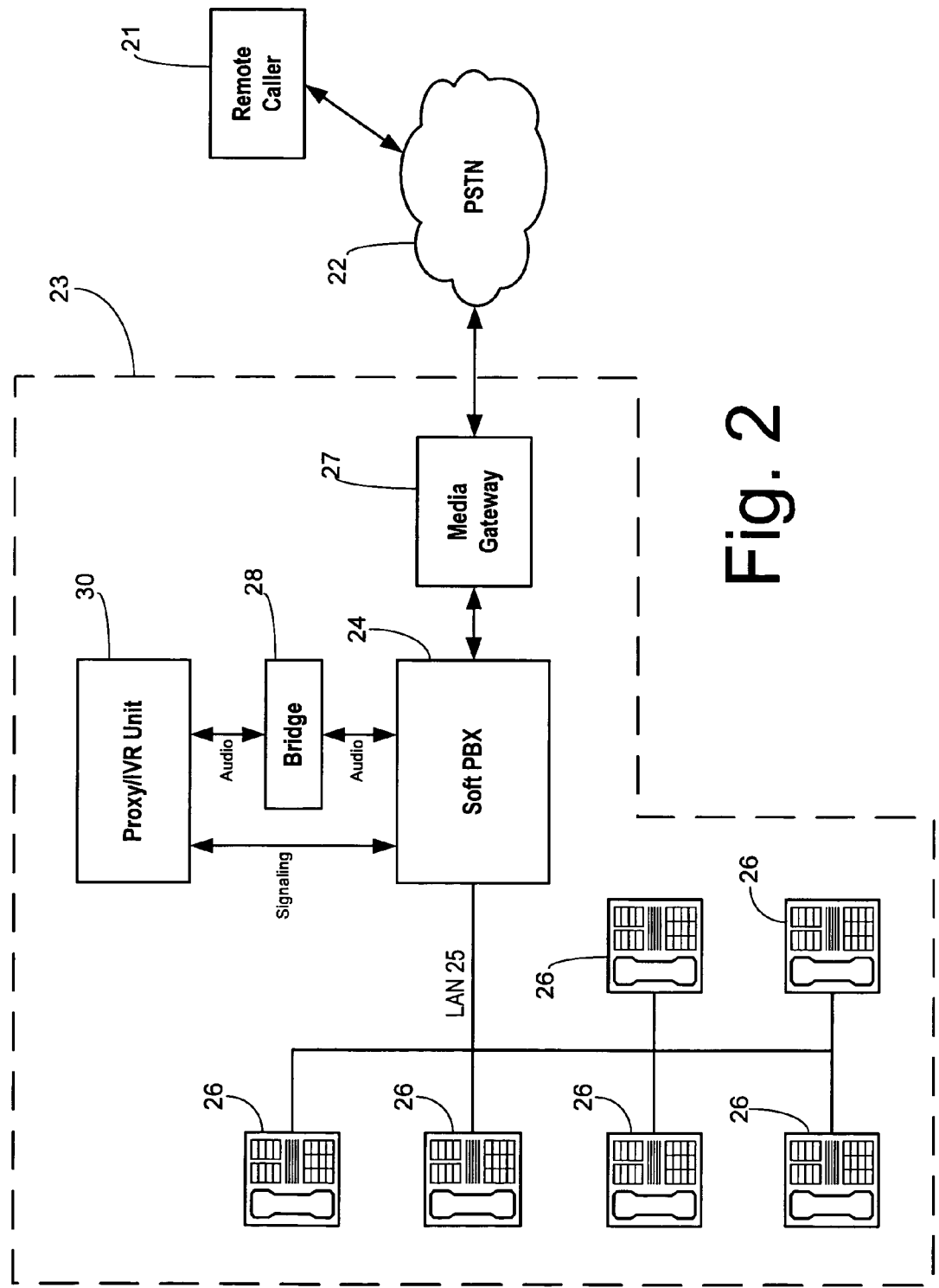
FIG. 2 is a block diagram showing a first embodiment of the present invention wherein the premise-based network includes a private branch exchange (PBX).

FIG. 2 shows a preferred embodiment of the present invention for establishing a conference call between multiple call participants. For example, a conference call may include a remote caller 21 communicating via a PSTN 22 with a premise-based network 23. Network 23 may include a software-based PBX switch 24 connected by a LAN 25 to a plurality of stations or terminals 26. A media gateway 27 couples soft PBX 24 to PSTN 22. An analog bridge 28 has audio connections to both PBX 24 and to a proxy/intelligent voice response (IVR) unit 30. Soft PBX 24 and proxy/IVR unit 30 are also connected by a signaling link.

In operation, the components of FIG. 2 generate a virtual audio bridge extension that leverages the connection capabilities of the premise-based communication network. A proxy conferencing endpoint is comprised of proxy/IVR unit 30 which accepts a request call for initiating a conference and then connects all the endpoints of the conference call within the premise-based network.

Figure 3:
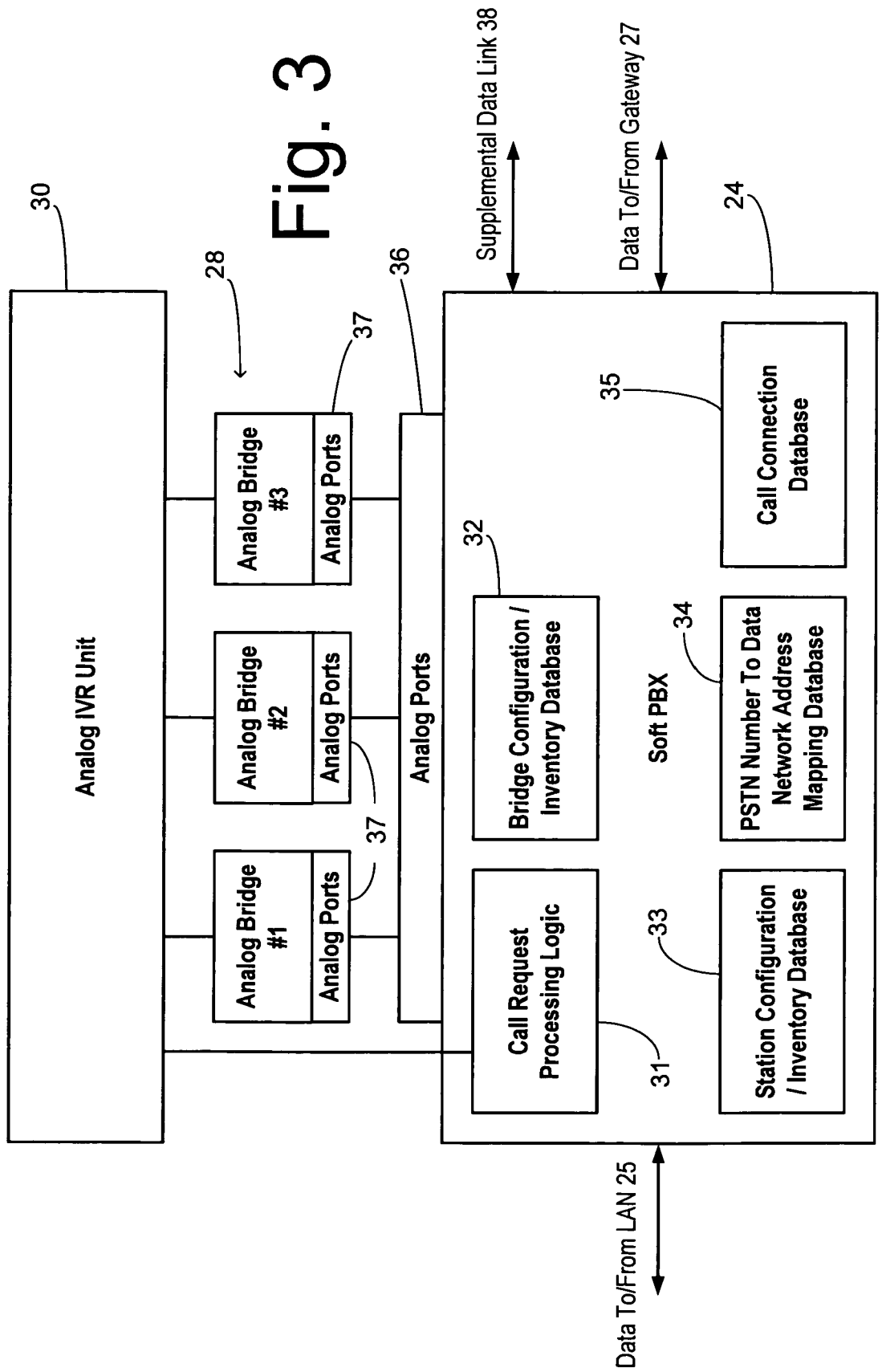
FIG. 3 is a block diagram showing the soft PBX controller and conference bridge of FIG. 2 in greater detail.

Soft PBX 24 and bridge 28 are shown in greater detail in FIG. 3. Soft PBX 24 includes call request processing logic block 31, bridge configuration/inventory database 32, station configuration/inventory database 33, PSTN number to data network address mapping database 34, and a call connection database 35. Analog ports 36 of soft PBX 24 are connected to analog ports 37 of bridge 28. Bridge 28 preferably includes a plurality of separate analog bridges #1, #2 and #3, as shown. Each analog bridge has a separate audio connection with analog IVR unit 30.

An incoming request for local bridging of conference call participants is routed by call request processing logic 31 to the first analog port servicing an available analog bridge. The status of each bridge is tracked by call request processing logic 31 and stored in bridge configuration/inventory database 32. The incoming request is connected to proxy/IVR unit 30 by the selected bridge, and then IVR unit 30 prompts the requester for connection numbers of participants to the conference call. After collecting the collection numbers, IVR unit 30 transmits the connection numbers via the signaling link to call request-processing logic 31. Call request processing logic 31 treats each connection number as a request for a call connection by a respective analog port connector of the selected bridge. The connection number is looked up in database 34 to determine the network location corresponding to the identified telephone number corresponding to the desired conference call participant.

Using the station configuration/inventory database 33, call request processing logic 31 initiates a call to the identified participant. If the call is answered then the endpoint is connected to an analog port of the selected bridge (e.g., the base bridge port address plus one for each additional endpoint added, where the base bridge port is the first port of the bridge selected by the original incoming request call). An incoming request call may preferably be initiated by a person who generates analog audio commands (e.g., touch tones or spoken commands) during set-up of a conference call. Alternatively, connection numbers for participants may be stored in an electronic system and provided to call request processing logic 31 via a supplemental data link 38. For example, data link 38 may be connected to a public conference bridge which is requesting local conference bridging as part of a larger conference call. Alternatively, the public bridge could transmit connection numbers of endpoints by DTMF tones via an analog request call coupled to the IVR unit.

Figure 4:
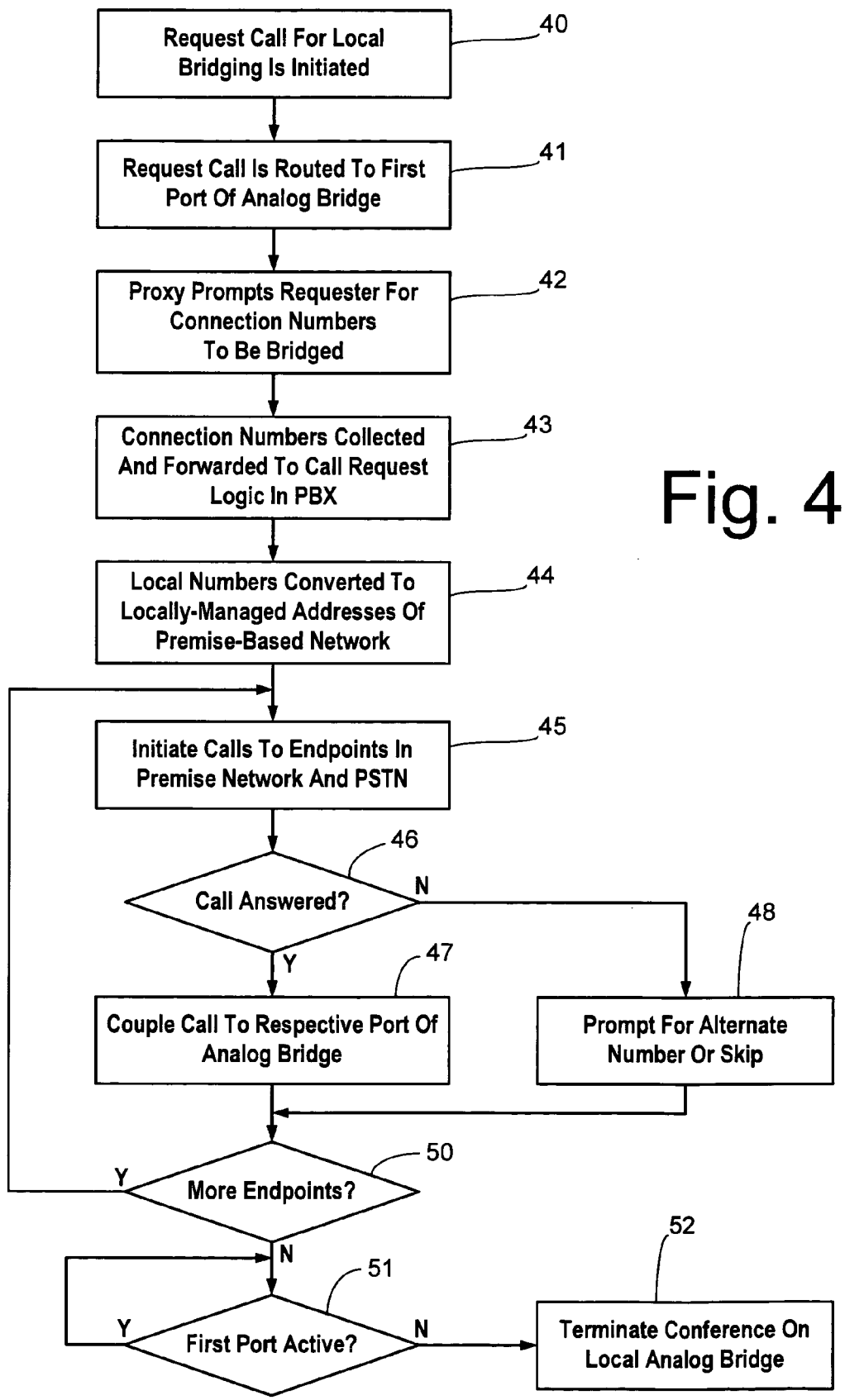
FIG. 4 is a flowchart showing one preferred method of the present invention.

A preferred method of the present invention is shown in greater detail in FIG. 4. In step 40, a request call for local bridging is initiated. The requester may be an individual making a request call from either a remote terminal connected by the PSTN or a local terminal within the premise-based network. Preferably, a predetermined telephone number corresponding to the local conference call set-up service is dialed by the requester. In step 41, the request call is routed to the first port of an analog bridge thereby enabling the requester to communicate with the proxy. The proxy prompts the requester for connection numbers to be bridged in step 42. Typically, a requester from a remote terminal identifies to the proxy the desired local connections within the premise-based network while the requester connects to any other desired endpoints not located within the premise-based network using a separate conference bridge. If the requester initiates a conference call from a local terminal within the premise-based network, then the connection numbers provided to the proxy may preferably include at least one conference call endpoint comprised of a remote terminal accessed via the PSTN.

In step 43, the connection numbers are collected and forwarded to the call request processing logic in the soft PBX controller. In step 44, the local connection numbers corresponding to desired endpoints within the premise-based network are converted to the locally-managed addresses used within the premise-based network to communicate with the endpoint terminals. The locally-managed addresses may, for example, include an IP address within the LAN. In step 45, calls are initiated to the specified endpoints within the premise-based network and any remote endpoint in the PSTN.

A check is made in step 46 to determine whether a particular call has been answered. If yes, then the answered call is coupled to a respective port of the selected analog bridge. If not answered, then the IVR unit prompts the requester to enter a command for an alternate number or a command to skip the participant. A check is made in step 50 to determine whether there are more endpoints to be called, and if so, then a return is made to step 45.

If there are no more endpoints to be called, then the local bridge is opened (i.e., fully activated) and the conference call proceeds. A check is made in step 51 to determine whether the first port is active. The first port will remain active as long as the original requester continues to participate in the conference call. If the first port is not active, then the requester has left the conference call and the conference on the local analog bridge is terminated in step 52.

Figure 5:
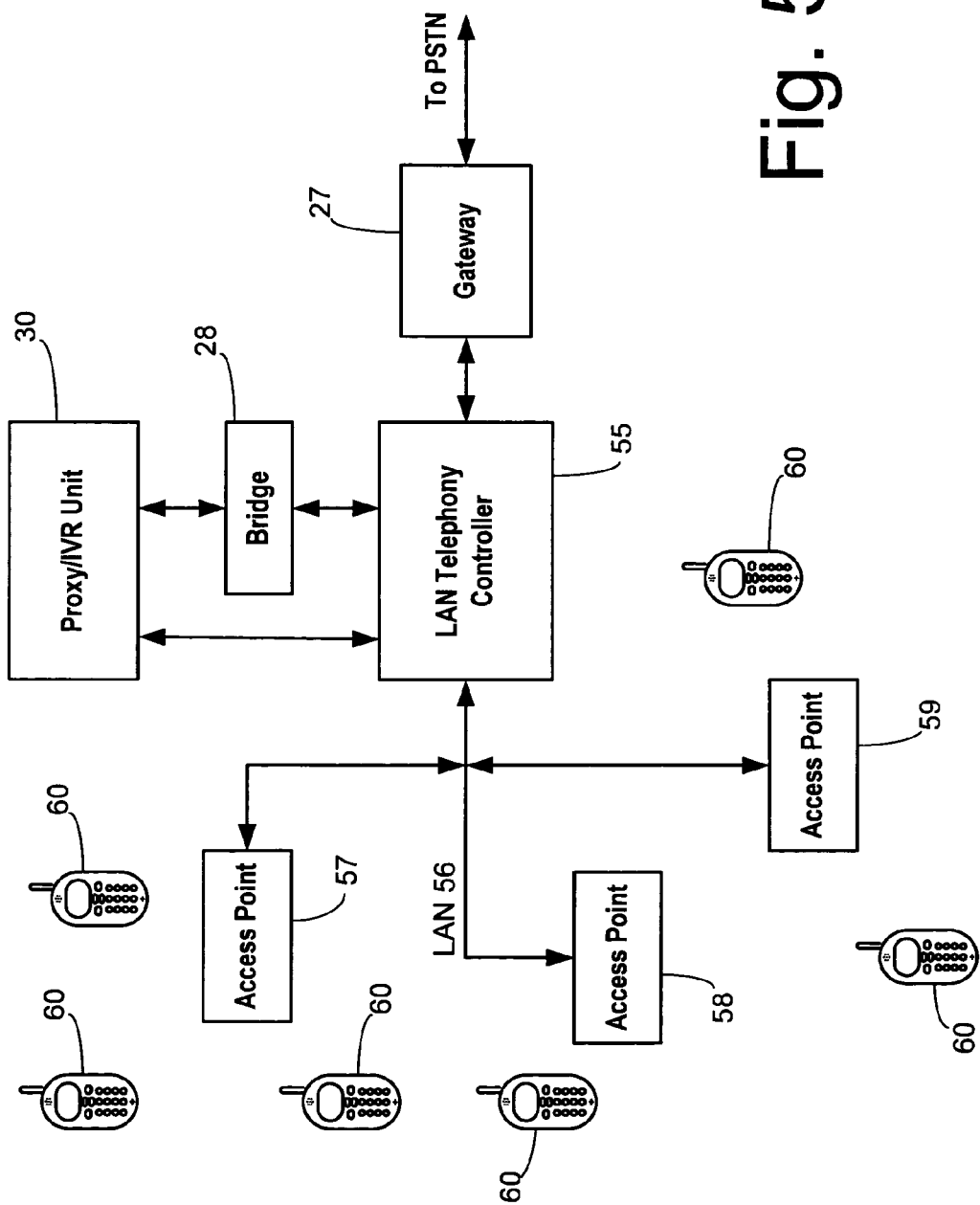
FIG. 5 is a block diagram of an alternative embodiment wherein the premise-based network includes a wireless LAN telephony system.

FIG. 5 shows an alternative embodiment of the present invention wherein the premise-based telephony network includes a wireless LAN (WLAN) IP telephony system. A LAN telephony controller 55 is connected to a LAN 56 including wireless access points 57, 58 and 59. A plurality of wireless telephone units 60 are configured to operate with access points 57–59 to provide premise-based telephony services. Each terminal 60 has a corresponding network IP address and may be coupled to an analog conference bridge via LAN telephony controller 55.

What is claimed is:

1. A method for completing a conference call in a telephony system, wherein said telephony system includes a premise-based network having a local controller coupled to local endpoints, a local proxy, and a local conference bridge, and wherein said telephony system includes a public telephone network coupled to said premise-based network, said conference call including a plurality of participants from said premise-based network and at least one participant from said public telephone network, said method comprising the steps of:

initiating a request call that is completed within said premise-based network to said proxy for setting up said conference call;

routing said request call to said conference bridge;

providing a plurality of said local endpoints for participation in said conference call to said proxy via said request call;

said local controller contacting said plurality of local endpoints and routing successful connections to said conference bridge; and bridging said request call and said successful connections at said conference bridge, wherein said bridging includes a connection to said at least one participant from said public telephone network.

2. The method of claim 1 wherein said request call is initiated from a remote endpoint via said public telephone network.

3. The method of claim 1 wherein said request call is initiated from a public conference bridge, and wherein said step of providing said plurality of said local endpoints is comprised of transmitting a list of said local endpoints from said public conference bridge to said proxy.

4. The method of claim 3 wherein said list is transmitted via a digital link.

5. The method of claim 1 wherein said proxy includes an intelligent voice response (IVR) unit that is responsive to analog audio commands.

6. The method of claim 5 wherein said request call is initiated from a user terminal at a remote endpoint via said public telephone network, and wherein a user generates said analog audio commands via said user terminal.

7. The method of claim 5 further comprising the step of:
said IVR unit generating a series of prompts for obtaining said analog audio commands for identifying predetermined telephone numbers corresponding to said plurality of local endpoints.

8. The method of claim 5 wherein said request call is initiated from a user terminal within said premise-based network, and wherein a user generates said analog audio commands via said user terminal.

9. The method of claim 8 further comprising the steps of:
providing at least one remote endpoint within said public telephone network for participation in said conference call to said proxy via said request call;

said local controller contacting said remote endpoint and routing any successful connection to said conference bridge; and bridging said remote endpoint and said plurality of local endpoints at said conference bridge.

10. The method of claim 1 wherein said plurality of local endpoints are identified by respective telephone numbers obtained during said request call.

11. The method of claim 10 wherein said premise-based network includes locally-managed addresses for accessing said plurality of local endpoints, said method further comprising the step of:

converting said respective telephone numbers to corresponding ones of said locally-managed addresses using a mapping database.

12. Telephony apparatus comprising:

a premise-based network including a local endpoints having associated local connection addresses and a local controller for interfacing said local endpoints with a public telephone network, wherein said premise-based network is coupled via a gateway to a public telephone network;

an analog conference bridge having a plurality of ports; and an intelligent voice response (IVR) unit coupled to said analog conference bridge;

wherein said local controller responds to a request call for setting up a conference call by coupling said request call to said analog conference bridge, wherein said IVR unit identifies selected ones of said local endpoints for inclusion in said conference call, wherein said local controller couples a plurality of said selected ones of said local endpoints to respective ports of said analog conference bridge and wherein at least one participant to said conference call is connected from said public telephone network.

13. The telephony apparatus of claim 12 wherein said premise-based network is comprised of a wireless LAN IP telephony system.

14. The telephony apparatus of claim 12 wherein said premise-based network is comprised of a private branch exchange (PBX) telephony system.

15. The telephony apparatus of claim 12 wherein said local controller comprises:

a bridge configuration database for tracking usage of said plurality of ports;

a voice station number to data network address mapping database for correlating telephone numbers used in said public telephone network with said local connection addresses; and call request processing logic for routing said request call to a first port of said analog conference bridge, for initiating calls to said selected ones of said local endpoints in response to said voice station number to data network address mapping database, and for selecting respective ports for coupling to said selected ones of said local endpoints in response to said bridge configuration database.

* * * * *